United States Patent [19]
Strutt et al.

[11] Patent Number: 5,822,586
[45] Date of Patent: Oct. 13, 1998

[54] ENTITY MANAGEMENT SYSTEM WITH REMOTE CALL FEATURE

[75] Inventors: Colin Strutt, Westford; James Anthony Swist, Arlington, both of Mass.

[73] Assignee: Digital Equipment Corporation, Maynard, Mass.

[21] Appl. No.: 707,357

[22] Filed: Sep. 4, 1996

Related U.S. Application Data

[63] Continuation of Ser. No. 353,733, Dec. 9, 1994, abandoned, which is a continuation of Ser. No. 864,802, Apr. 7, 1992, abandoned.

[51] Int. Cl.$^6$ .................................................. G06F 13/00
[52] U.S. Cl. ............................................................. 395/684
[58] Field of Search ............................. 395/200.47, 200, 395/43, 200.53, 200.57, 684

[56] References Cited

U.S. PATENT DOCUMENTS

| | | | |
|---|---|---|---|
| 4,694,396 | 9/1987 | Weisshaar | 364/DIG. 1 |
| 4,731,735 | 3/1988 | Borgendale | 395/600 |
| 4,823,122 | 4/1989 | Mann | 340/825.28 |
| 4,968,977 | 11/1990 | Chinnaswamy | 340/825.28 |
| 5,065,347 | 11/1991 | Pajak | 395/159 |
| 5,150,464 | 9/1992 | Sidhu | 395/200 |

FOREIGN PATENT DOCUMENTS

0414624A2 2/1991 European Pat. Off. .

OTHER PUBLICATIONS

A.D. Birrell et al, "Implementing Remote Procedure Calls", ACM Transactions on Computer Systems, vol. 2, No. 1, Feb. 1, 1984, New York, pp. 39–59.

"Showing all Service Group and Configuration fle References to a Remote Procedure Call Object", IBM Technical Disclosure Bulletin, vol. 34, No. 8, Jan. 1992, New York, pp. 380–0381.

*Primary Examiner*—David Y. Eng
*Attorney, Agent, or Firm*—Cathy L. Peterson; Ronald C. Hudgens; Arthur W. Fisher

[57] ABSTRACT

Apparatus and a related method for managing entities in a complex and, in general, geographically distributed system, such as distributed data processing system. The management approach is defined in terms of a generalized model having management modules integrated into a single cooperative system by a management director kernel. The management modules include presentation modules to provide an interface with users who manage the complex system, access modules to provide an interface with managed entities or devices, and function modules to define various functions that may be performed in controlling or monitoring the managed entities. If the complex system being managed is large, a managed entity and an associated access module may be located on one physical system, while a presentation module is located on another physical system, close to the user, and a function module being used might be located on yet another physical system, for reasons of processing convenience. The present invention provides a convenient mechanism, consistent with the management model, for forwarding procedure calls between management modules located on different physical systems, through management director kernels located on different physical systems. Two types of remote procedure calls are disclosed, one to forward procedure calls for invoking primitive functions, each on a single managed entity, and a more powerful remote procedure call for invoking higher-level functions relating to user-defined domains of multiple managed entities.

8 Claims, 6 Drawing Sheets

ENTITY MANAGEMENT SYSTEM WITH REMOTE CALL FEATURE

This application is a continuation of application Ser. No. 08/353,733, filed Dec. 9, 1994, now abandoned, which is a continuation of application Ser. No. 07/864,802, filed Apr. 7, 1992 now abandoned.

CROSS-REFERENCE TO RELATED APPLICATION

This application is closely related to application Ser. No. 07/402,391, filed Sep. 7, 1989, and entitled "Entity Management System," which application is hereby incorporated by reference into the present specification now U.S. Pat. No. 5,345,587.

BACKGROUND OF THE INVENTION

This invention relates generally to the field of management of complex systems, such as distributed digital data processing systems, and, more particularly, to the management of complex systems that are geographically dispersed. Even more specifically, one aspect of the present invention relates to a technique that facilitates remote management of logical groupings of "target entities," i.e. targets of a management operation.

The cross-referenced application explains the field of management of complex systems in the context of distributed digital processing systems, but a summary of the concepts and terminology is needed here to provide a meaningful background to understanding the present invention.

As digital data processing systems, or computers, have become smaller and less expensive, individual computers are being used by individuals and small groups. To enhance sharing of data, communication among users, and economy in connection with computing resources, computers have been connected into networks, over which communication takes place by means of messages transmitted over communication links. In addition to the user computers, networks include "servers," which provide services to users connected to the networks. A server may, for example, may control access to large amounts of data, or may control printers, telecommunications equipment, and so forth. A server may also provide specialized computational services, such as database searching and sorting. The servers and the user computers, sometimes referred to as clients, are interconnected by communications links to permit messages to be transferred among various computers and servers, and all of these components comprise a distributed system.

Management of such complex distributed systems encompasses at least five functional areas: configuration management, fault management, performance management, accounting management and security management. Configuration management includes the ability to modify operating parameters of a network and its components, and the ability to identify every component and to reconfigure the network. Fault management refers to the detection, diagnosis, correction, and prevention of network and system faults and error conditions. Performance management is the monitoring of the performance of managed "objects" or "entities," as well as the monitoring of the network as a whole. Accounting management deals with the ability to monitor the use of network and system resources, to identify the costs associated with usage, and to generate the data needed to charge the appropriate users. Security management defines those facilities required to manage services, such as authentication of users' and providers' identities, control of access to resources, and the confidentiality of information within the network environment.

More generally, network management functions fall into just two categories: monitoring and control. A managed "entity" may be subject to control by a management function, such as when a network element is activated or switched to a different operating mode or speed, or may be subject to monitoring, such as when a computer device is polled for its current status. Management functions are rendered more complex by the diverse nature of many networks. A distributed network is likely to combine voice data, text data and image technologies, is likely to contain products supplied by multiple vendors, and is, by definition, widely distributed geographically. In addition, the network may be growing rapidly and consist of thousands of computer systems.

The management process for controlling or monitoring a single managed entity can be conveniently viewed is involving two components: the managed entity and a managing entity, referred to in this specification as a director. The director includes a presentation module, for interface with elements outside of the director, such as with management personnel; a function module, which defines one or more management functions that can best be characterized as higher-level or value-added functions; and an access module, defining mechanisms for control and monitoring of a managed entity at a lower level. In contrast to the higher-level functions performed by function modules, access modules perform functions at what is best characterized as a primitive level. Practically all problems involving the management of complex systems can be analyzed using this management director model. For directors that control or monitor multiple managed entities, there may be multiple presentation modules, multiple function modules and multiple access modules, although the director may have a common interface for connecting the various modules, and a common executive. Moreover, there may be sharing of some modules. For example an access module providing access to a particular managed entity may be shared by multiple function modules. Specifically, a single access module might provide access to a computer system for purposes of performance monitoring (involving a first function module) and modification of operating parameters (involving a second function module).

A potential difficulty in entity management is that the necessary modules of the director may be geographically dispersed. The access module must often be located close to the managed entity, the presentation module is typically located close to the manager or operator, but may be located on a different local area network, and the function module may well be located on a third computer system.

The need for geographic dispersion of the management modules will not always arise. For example, in a single self-contained network with perhaps only a few dozen components, a single management system will suffice to allow a single manager to control and monitor the environment. If the distributed network is spread over a small number of interconnected sites, separate site managers might well be able to handle most of the management problems, with occasional face-to-face meetings to resolve any issues that require their mutual cooperation. Again there is no need for a distributed solution. However, if the distributed network is truly heterogenous, and there is overlapping management responsibility among the sites, a more generalized solution involving distribution of the management director capabilities is desired.

Some degree of distribution of management director capabilities is afforded by mechanisms known in the art. For example, an interface between a user and a presentation module can be distributed geographically by using available remote terminal connection mechanisms. But available mechanisms fall short of providing a generalized technique for use when management modules are distributed across different systems.

One known mechanism of the prior art that has a limited capability to invoke a procedure remotely is the remote procedure call, or RPC. In the remote procedure call, a procedure is invoked in one system and executed in another system. Usually, the code that invokes the procedure has no "knowledge" that the procedure is actually executed in another system. The typical way in which the remote procedure call is implemented is that the name of the procedure is the key that determines which system will execute the procedure. As will become apparent from the detailed description that follows, this conventional remote procedure call technique is of little or no help in the context of the present invention. The invention is concerned with the problems inherent in invoking only two types of procedures remotely: a remote call to a function module and a remote call to an access module. As will also be better appreciated from the detailed description, the services that these remote calls provide are distinguished by various arguments associated with the call, rather than by the call name. Accordingly, the standard RPC technique cannot be used.

In brief, the present invention provides a simple but effective solution to problems arising in distributed management of complex systems. The invention is defined by the claims appended to this specification, and is summarized in the following descriptive section.

SUMMARY OF THE INVENTION

The present invention resides in apparatus, and a related method, for managing entities that may be distributed over multiple physical systems and multiple geographical locations. The apparatus of the invention is embodied in a management system for monitoring or controlling at least one managed entity, which is a component of a complex and interactive collection of components.

Briefly, and in general terms, the management system of the invention comprises at least one management module of a first type, referred to for convenience as a presentation module; at least one management module of a second type, referred to as a function module; at least one management module of a third type, referred to as an access module; and a management director kernel, for facilitating communication between a user of the system and one or more managed entities, through the management modules. A management module of the first type communicates between a user of the system and a management module of the second type, and a management module of the second type communicates between management modules of the first and third types, and performs a management function that requires forwarding of a user-initiated procedure call to a management module of the third type. A management module of the third type communicates the procedure call from a management module of the second type to a managed entity, and performs a desired function in relation to the managed entity.

In the distributed arrangement with which the invention is concerned, the management modules of at least two of the first, second and third types are in different physical systems or at different locations, and the functions of the management director kernel may be performed by management director kernel subsystems at different locations. Further, the management director kernel includes remote call processing means, for processing a procedure call that must be forwarded from a management module in one location to a management module in another location.

The management director kernel includes remote call processing means, for processing a procedure call that must be forwarded from a management module in one location to a management module in another location. In accordance with one aspect of the invention, the remote call processing means includes remote access call processing means, for processing calls to invoke primitive functions in at least one management module of the third type, each such call being directed to the management of a single target entity. More specifically, the remote access call processing means includes means for determining for each call the identities of director kernel subsystems from which the target entity that is the subject of the call, can be managed; means for forwarding the call to a selected director kernel subsystem; and means in the selected director kernel subsystem, for forwarding the call through a management module of the third type, to the target entity to be managed. If the means for determining the identities of director kernel subsystems from which the target entity can be managed determines that the target entity can be managed from anywhere, the remote access call processing means selects the current director kernel subsystem for management of the target entity.

In accordance with another aspect of the invention, the remote call processing means includes remote function call processing means, for processing calls to invoke a higher-level function in at least one management module of the second type, each such call being executed in the context of a logical grouping of target entities, referred to as a domain. More specifically, the remote function call processing means includes means for confirming that the call is made in the context of a domain; a domain database associated with the management director kernel; means for determining from the domain database the identity of the director kernel subsystem that is responsible for the domain named in the call; means for forwarding the call to the director kernel subsystem responsible for the domain named in the call; means operative in the director kernel subsystem responsible for the domain, for determining whether the call can be satisfied without invoking a call to another management module; and means operative in the director kernel subsystem responsible for the domain, for invoking a management module of the second type if the call cannot be satisfied without doing so, wherein the invoked management module of the second type performs a desired function in the context of the domain named in the call.

In one illustrative form of the invention, the procedure call requests historical data pertaining to operation of the domain entities, and the remote function call processing means will obtain the historical data, if possible, directly from a database located on the system that is responsible for the domain, and in which historical data is recorded, or will obtain the requested data by invoking an appropriate management module of the second type. In another illustrative form of the invention, the procedure call pertains to a background function being performed in relation to some or all of the entities belonging to the domain, and invokes a management module of the second type.

In terms of a method or process, the invention comprises the steps of coordinating, in a management director kernel, communication of requests from a user, to control or monitor the managed entity, and the communication of response information back to the user; communicating, in at least one management module of a first type, between the user and a management module of a second type; communicating, in at least one procedure callule of a second type, user-initiated procedure calls between a management module or the first type and a management module of a third type; and communicating, in at least one management module of a third type, a user-initiated procedure call from a management module of the second type to a managed entity, to perform a desired function in relation to the managed entity.

In management systems with which the invention is concerned, the management modules of at least two of the first, second and third types are at different locations and the functions of the management director kernel are performed by management director kernel subsystems at different locations. The method of the invention includes processing at least one remote procedure call that must be forwarded from a management module in one location to a management module in another location.

In accordance with one aspect of the invention, the step of processing a remote procedure call includes processing a remote access call, to invoke a primitive function in at least one management module of the second type, each such call being directed to the management of a single target entity. The step of processing a remote access call includes determining for each call the identities of director kernel subsystems from which the target entity that is the subject of the call, can be managed; forwarding the call to a selected director kernel subsystem; and, in the selected director kernel subsystem, forwarding the call through a management module of the third type, to the target entity to be managed. If the step of determining the identities of director kernel subsystems from which the target entity can be managed determines that the target entity can be managed from anywhere, the step of processing a remote access call selects the current director kernel subsystem for management of the target entity.

In accordance with the other aspect of the invention, the step of processing a remote procedure call includes processing a remote function call, to invoke a higher-level function in at least one management module of the second type, each such call being executed in the context of a logical grouping of target entities, referred to as a domain. More specifically, processing a remote function call includes confirming that the call is made in the context of a domain; determining from a domain database associated with the management director kernel the identity of the director kernel subsystem that is responsible for the domain named in the call; forwarding the call to the director kernel subsystem responsible for the domain named in the call; determining, in the director kernel subsystem responsible for the domain, whether the call can be satisfied, such as by retrieving historical data, without invoking a call to another management module; and invoking, in the director kernel subsystem responsible for the domain, a management module of the second type if the call cannot be satisfied without doing so. The invoked management module of the second type performs a desired function in the context of the domain named in the call.

As noted earlier, the remote function call may be used to retrieve historical data relating to a domain of managed entities, or may relate to a background task being performed in relation to some or all of the entities belonging to the domain.

It will be appreciated from the foregoing that the present invention represents a significant advance in the field of management of complex entities, such as distributed data processing systems. In particular, the invention provides a mechanism for passing procedure calls to remotely located management entities, consistent with a unified model of the management function. Two types of remote procedure calls are disclosed: a remote access call to invoke a primitive function of a single selected managed entity, and a remote function call to invoke a more complex function in the context of a domain of managed entities. In both cases, the mechanism of the invention forwards a procedure call to the appropriate management module, making use of management director kernels located in multiple physical systems. The remote function call made in the context of a domain provides the user with extremely useful domain-related data in a convenient and transparent manner.

From the above summary, it will also be appreciated that the standard remote procedure call (RPC) of the prior art cannot be adapted to provide the same range of services as the present invention. The standard RPC provides services that are distinguishable from each other only by the use of different procedure names. In the present invention only two broad types of procedure are distinguishable by procedure name: the remote access call and the remote function call. But each type of call can be used to perform a variety of management operations, defined by arguments of the procedure calls. The remote access call is invoked to perform a selected primitive function in any selected managed entity, and the remote function call is invoked to perform a selected higher-level function in the context of a domain of managed entities.

Other aspects of the invention will become apparent from the following more detailed description, taken in conjunction with the accompanying drawings.

DESCRIPTION OF THE PREFERRED EMBODIMENT

Figure 1:
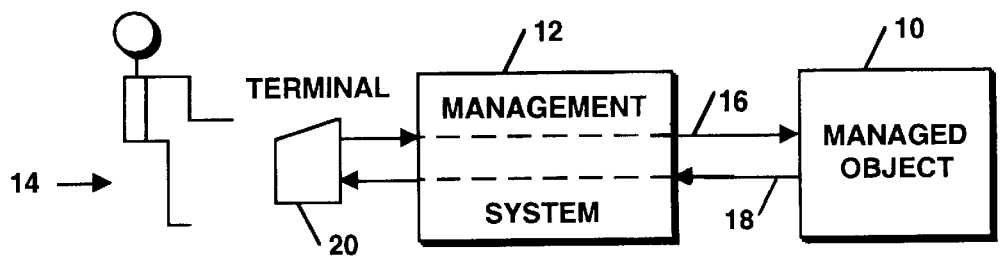
FIG. 1 is a diagram showing the basic concept of management of a managed object through a management system.

As shown in the drawings for purposes of illustration, the present invention is concerned with the management of complex systems, such as interconnected computer networks. A basic management model is shown in FIG. 1, and applies generally to the management of almost any entity. The model includes three major components: a managed object, indicated by reference numeral 10, a management system 12 and a user 14. The managed object 10 is any system or device that has multiple controllable or observable states. In the application with which the invention is principally concerned, the managed object may be a computer system, or a communication device, or a computer peripheral device such as a printer. The managed object 10 is either controlled by the management system 12, as indicated by line 16, or is monitored by the management system, as indicated by line 18, or both. The management system 12, in turn, receives control signals from the user 14 and supplies data back to the operator, both by way of a user interface, illustrated as an operator terminal 20.

Figure 2:
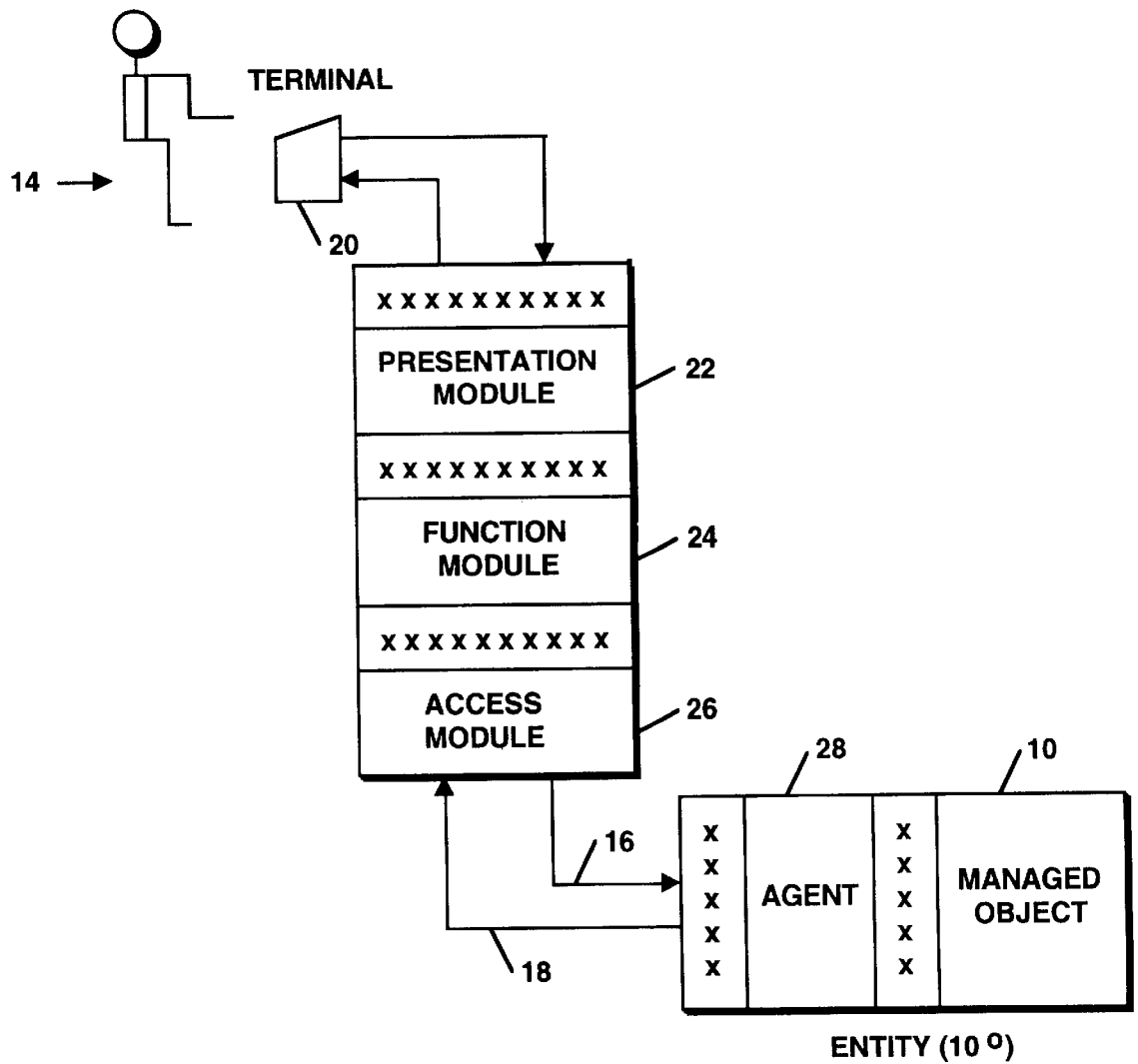
FIG. 2 is a block diagram depicting the components involved in managing a single object in more detail.

Management of a single object is further illustrated in principle in FIG. 2, in which the management system 12 is termed a "director" and the managed object 10 is shown as being part of a managed "entity" 10'. The director 12 includes three types of modules: presentation modules, one of which is shown at 22, function modules, one of which is shown at 24, and access modules, one of which is shown at 26. The presentation module 22 defines the appearance of management information presented by the director 12 to elements outside it, such as users or other management systems. The function module 24 defines one or more services offered by management applications residing within the director 12. The access module 26 defines the mechanisms for control or monitoring of managed entities.

The shaded areas in FIG. 2 represent internal and external interfaces between various modules. It will be understood that the division of functions among the various modules and interfaces is, to some degree, a matter of design choice. Nevertheless, the illustrated director and entity models are useful generalizations with which to view the process of management of complex systems.

Figure 3:
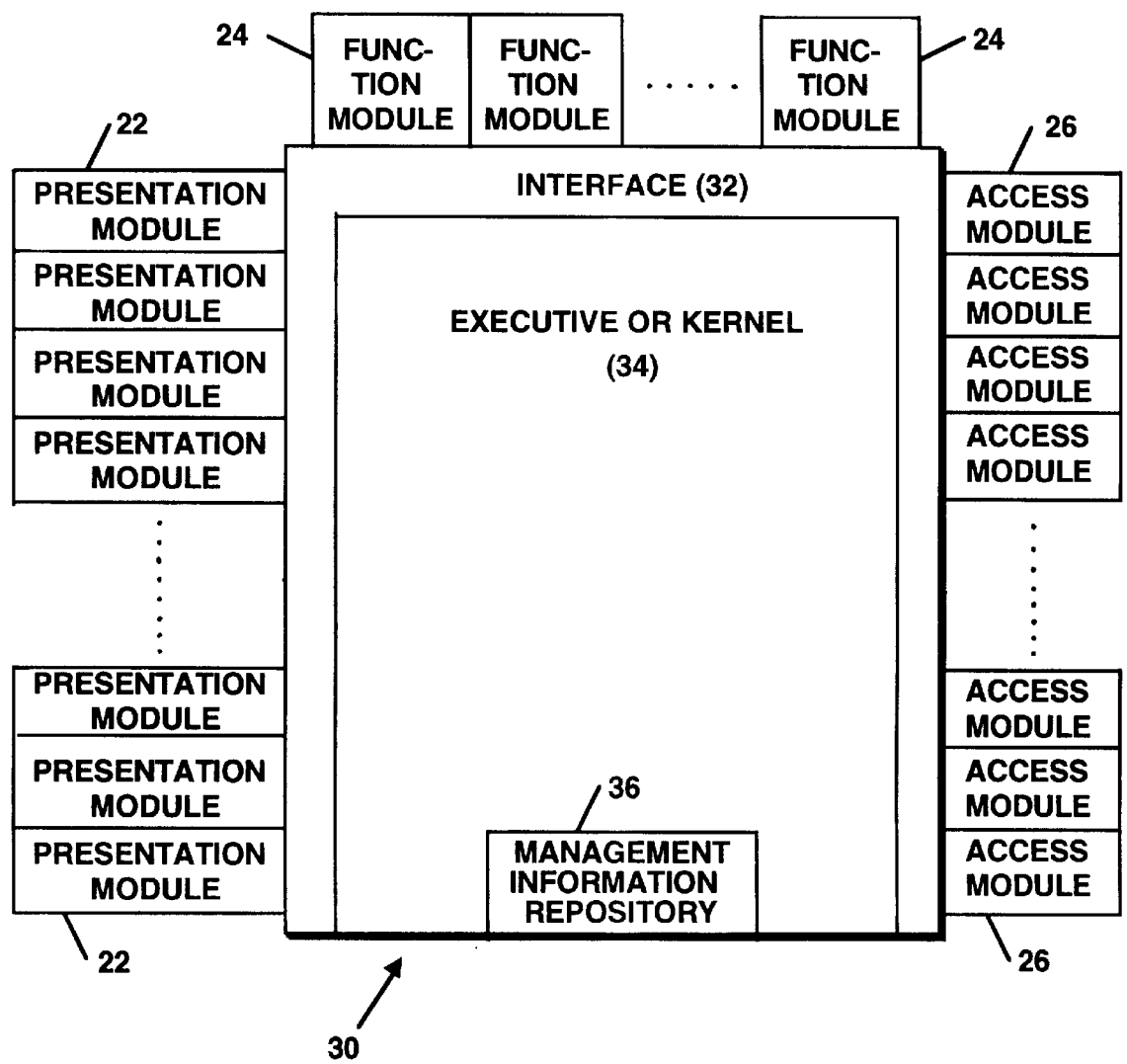
FIG. 3 is a diagram showing the components of a management system, including management modules and a management director kernel.

The foregoing description relates to the management of a single entity or object. A more realistic situation is one in which there are multiple managed objects, requiring multiple access modules, multiple function modules and, in general, multiple presentation modules. The director components are then something like those shown in FIG. 3. Multiple presentation modules 22, multiple function modules 24 and multiple access modules 26 are shown as being connectable to a director kernel 30, comprising an interface section 32, an executive 34 and a management information repository 36.

The interface section 32 and the executive 34 provide an environment for management modules to exist and to interoperate. The management modules (22, 24, 26) can then be simply "plugged in" to the director kernel and can operate without specific a priori knowledge of each other. The management information repository (MIR) 36 defines the structure and storage of management information within a director. The MIR provides the means for specifying and storing information about managed entities and management module services.

Figure 4:
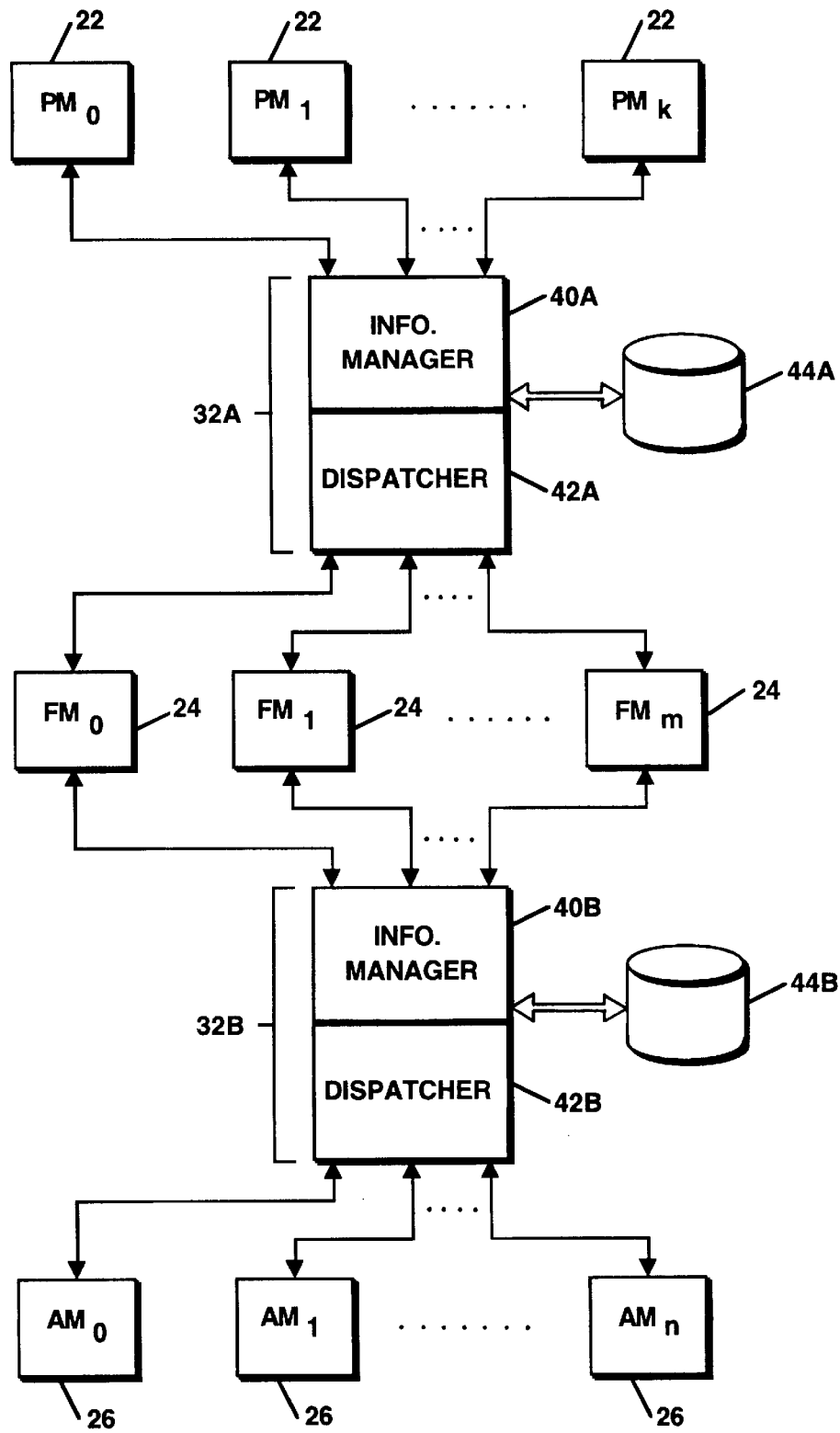
FIG. 4 is a block diagram also showing how the components of the management system interact from a control and/or data flow perspective.

FIG. 4 shows the components of a management system viewed from a slightly different perspective, including multiple presentation modules 22, multiple function modules 24 and multiple access modules 26. The director kernel or interface is indicated at 32A, connecting the presentation modules 22 to the function modules 24, and at 32B, connecting the function modules 24 to the access modules 26. The director kernel interface is shown as including three components: an information manager (40A, 40B), a dispatcher (42A, 42B) and a data storage module (44A, 44B). It will be understood, however, that in a simple configuration the information manager modules 40A, 40B in fact comprise a single computational module, and that the dispatchers 42A, 42B may also comprise a single module residing on a single computational machine.

Basically, the information manager 40A or 40B and the dispatcher 42A or 42B together process requests for communication between a management module on one level, such as a presentation module 22, and a management module on the next lower level in the figure, such as a function module 24. A more specific description follows.

If the information manager 40A receives a request from a presentation module 22 to which it can respond using the information in the data storage module 44A, it intercepts the request and generates a response to the request, which it transmits to an appropriate presentation module 22 for display to the operator who initiated the request. If the information manager 40A is unable to respond to the request, it then determines whether the request relates to the current time or a time in the future; that is, the information manager 40A determines whether the request should be processed immediately or scheduled for a specified time in the future. At the appropriate time, whether immediately or at the scheduled time, the information manager 40A transfers the request to the dispatcher 42A. From the nature of the request, the dispatcher 42A identifies a function module 24 to process the request, and transfers the request to that function module.

In response to the receipt of a request from the dispatcher 42A, the function module 24 proceeds to process the request. It may, in response to the request, initiate one or more operations, each represented by a request, referred to as a subordinate request, which it directs to another function module or to the function-access interface 32B. Upon receiving responses to all of the subordinate requests, the function module 24 generates a response, which it transmits to the dispatcher 42A. The dispatcher 42A then formulates a response, which it transmits, through the information manager 40A, to the appropriate presentation module 22 for display to an operator.

Similarly, a subordinate request from a function module 24, directed to the function-access interface 32B, is received initially by the information manager 40B. The data storage element 44B contains information, as provided by a historical data recorder function module, as to the condition of the complex system at various points in time, in particular, selected information as to the status and conditions of the various entities controlled by the access modules 26.

If the information manager 42B receives a subordinate request from a function module 24 to which it can respond using the information in the data storage element 44B, it intercepts the request and generates a response to the subordinate request, which it transmits to the function module from which it received the subordinate request. If the information manager 40B is unable to respond to a subordinate request from a function module 24, it then determines whether the request relates to the current time or a time in the future; that is, the information manager determines whether the request should be processed immediately or scheduled for a specified time in the future. At the appropriate time, whether immediately or at the scheduled time, the information manager 40B transfers the subordinate request to the dispatcher 42B. In response to the receipt of a subordinate request from the information manager 40B, the dispatcher 42B identifies an access module 26 to process the subordinate request and transfers the subordinate request to that access module.

In response to the receipt of a subordinate request from the dispatcher 42B, the access module 26 proceeds to process the request. It may, in response to the subordinate request, initiate one or more operations in connection with the entity of the complex system controlled by the access module. If the subordinate request requires the access module 26 to change the state or condition of the entity, it attempts to do so and generates a response containing status information indicating the status of the attempt, that is, for example, whether the change was successful, unsuccessful, or partially successful. On the other hand, if the subordinate request requires the access module 26 to identify the state or condition of the entity, it generates a response indicating the entity's state or condition. Finally, if the subordinate request requires the access module 26 to do both, it attempts to change the state or condition of the entity and generates a response indicating the status of the attempt and also the entity's new state or condition. In any case, the access module 26 transmits the response to the dispatcher 42B, which transfers it to the function module 24 that generated the request. The function module 24 uses the response from the access module 26 in formulating its response to a request from the dispatcher 42B at the presentation-function interface, or to a subordinate request from another function module, as appropriate. A function module 24, upon receiving a subordinate request from other function modules, processes it in the same manner as it processes a request from the dispatcher 42B.

The control arrangement depicted in FIG. 4 provides a number of advantages. Basically, it forms a processing chain, with each element along the chain attempting to process a request before passing it along to the next element. Thus, if the information manager 40A/B can process the request, based on the contents of the associated data storage module 44A/B, without requiring further processing by another element further down the chain, it does so. Furthermore, the control arrangement is extensible, so that additional presentation modules 22, function modules 24 and access modules 26 can be easily added, without changing the architecture of the control arrangement.

Figure 5:
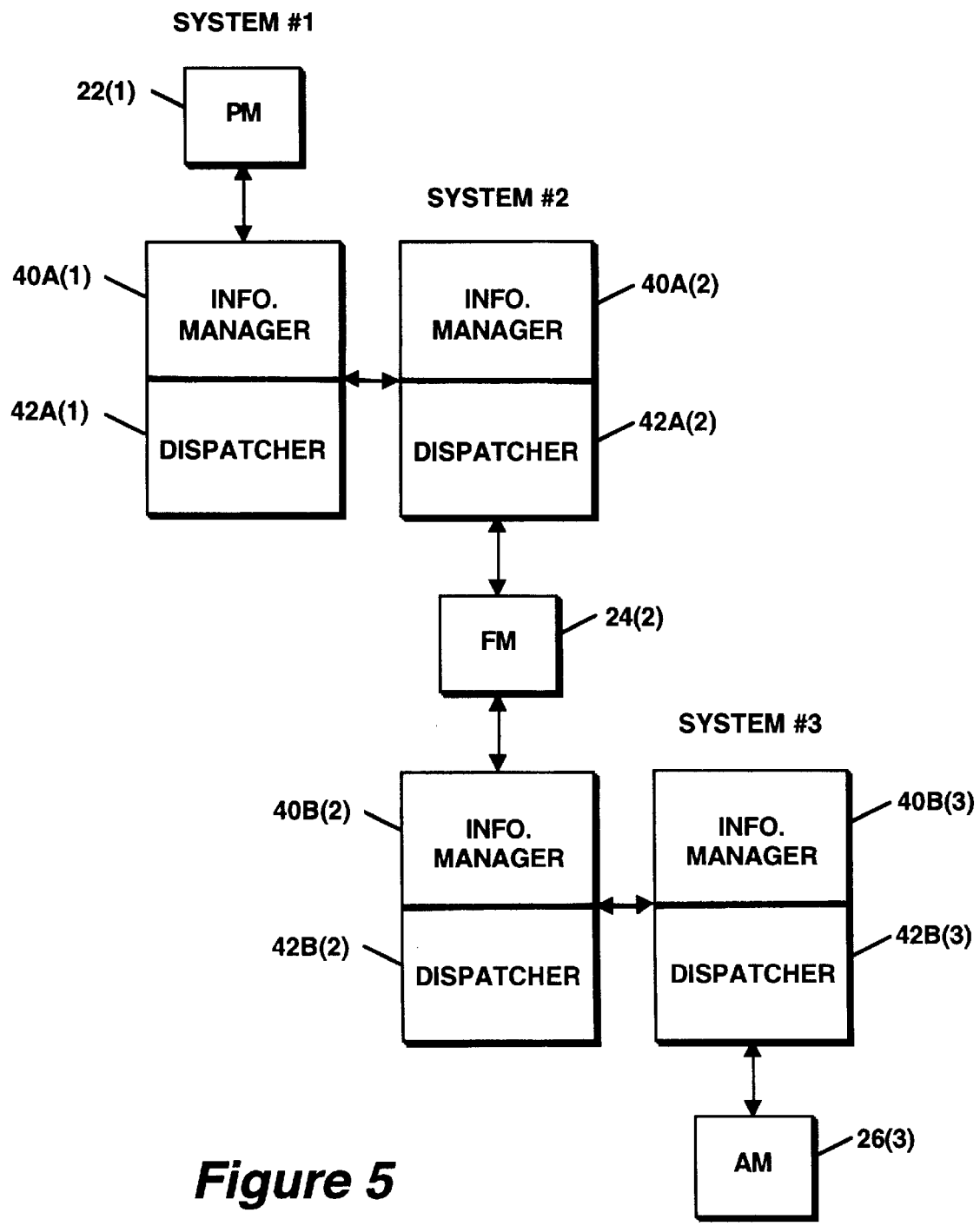
FIG. 5 is a block diagram of portions of a management system, similar in structure to FIG. 4, but having management modules located in different physical systems.

FIG. 5 is diagram that is similar to FIG. 4, in that the director kernel structure is depicted as comprising an information manager and a dispatcher, but different from FIG. 4 in two other respects. First, only a single management chain is shown, involving one presentation module, one function module and one access module. Second, these three modules are shown as being distributed among different systems. That is to say, the three management modules are physically located on different machines and probably in different locations. Moreover, the management function depicted necessarily involves multiple and separate management director kernels in different locations.

More specifically, the presentation module is located in system #1 and is indicated by numeral 22(1). Similarly, the function module is located in system #2 and is indicated at 24(2), and the access module in located in system #3 and is indicated at 26(3). A request, otherwise known as a procedure call, originating in presentation module 22(1) and invoking a procedure in function module 24(2) must necessarily utilize the services of a director kernel-in system #1 and a director kernel in system #2. In particular, the director kernel in system #1 employs an information manager 40A (1) and a dispatcher 42A(1), which communicate with an information manager 40A(2) and dispatcher 42A(2) in system #2. The latter dispatcher selects function module 24(2) to perform the requested procedure. Similarly, a procedure call originating in function module 24(2) employs an information manager 40B(2) and a dispatcher 42B(2) in system #2, which communicates with an information manager 40B (3) and dispatcher 42B(3) in system #3. Finally, dispatcher 42B(3) communicates the procedure to the access module 26(3), which performs a requested function on an associated managed object (not shown in this figure).

The present invention is concerned with the implementation of a remote procedure call in which the calling module and the called module are distributed across different physical systems, and may be distributed geographically. As can be seen from FIG. 5, there are two possible levels of remote calling when management modules are distributed. One is a remote call to invoke what might best be termed a "primitive" service, typically located in an access module. This type of call or request will be referred to in this specification as a "remote access call." The service provided by an access module is typically "primitive" in the sense that it might involve monitoring the current status of a managed object, or changing some parameter in the object, or switching it on or off. By way of contrast, the other type of remote call or request is to invoke what might be termed a "value-added" service, typically located in a function module. For example, a value-added request might inquire as to historical data concerning operation of the managed object or objects. This type of remote call will be referred to as a "remote function call."

It is worth noting that, in fact, from a user standpoint, there is no special remote function call or special remote access call. In keeping with the generalized management model described above and in the cross-referenced application, a called management module is unaware of whether it is being called "remotely" from a different system, or whether it is being called "locally" from the same system. Similarly, a calling management module need have no concern as to the location of the called module. The access calls and function calls are generalized to handle both local and remote calls, but the focus of the present explanation will be on the manner in which remote procedure calls are handled in the director kernel and management modules.

Typically, a remote access call is invoked by a function module 24 when it cannot satisfy a procedure call made to it without routing the call to an access module 26. The parameters of a remote access call include the identity of the management operation to be performed by the access module 26, and the name of the managed entity on which the management operation is to be performed. Again, this should be distinguished from a conventional remote procedure call (RPC), in which the management operation is specified by the procedure name. There are three possible situations involving remote access to a managed entity:

(a) The managed entity can be accessed from only one system. For example, if the managed entity is a modem or other piece of hardware connected to a specific input/output port of a computer system, there is simply no other access route to the entity.

(b) The managed entity can be accessed from a limited number of different systems.

(c) The managed entity can be accessed from any system.

If the situation is as described in (c), the entity is universally accessible from any system, and the concept of remote access is part of the normal management protocol interactions between the access module and the entity. If access is limited to one system, as in (a), or a number of systems, as in (b), it is necessary to associate with the managed entity a list of management directors that can access the entity. A mechanism is already available in the basic management model for taking care of this. The mechanism is known as the distributed name service (DNS). The name of each managed entity, and other information relating to the device, is stored in a universally accessible data base. To effect a remote access call, it is only necessary to add to the DNS some further information about each managed entity. Specifically, the DNS entry for each managed entity must also contain a list of the names of managing directors, if any, that can access the entity. If the list is empty, this is a default condition indicating that the entity may be accessed from anywhere. The mechanism for entering this information in the DNS is a management function module known as the registration function module. (In the cross-referenced application, these functions were described as being performed by a management function module referred to as the configuration function module.)

Figure 6:
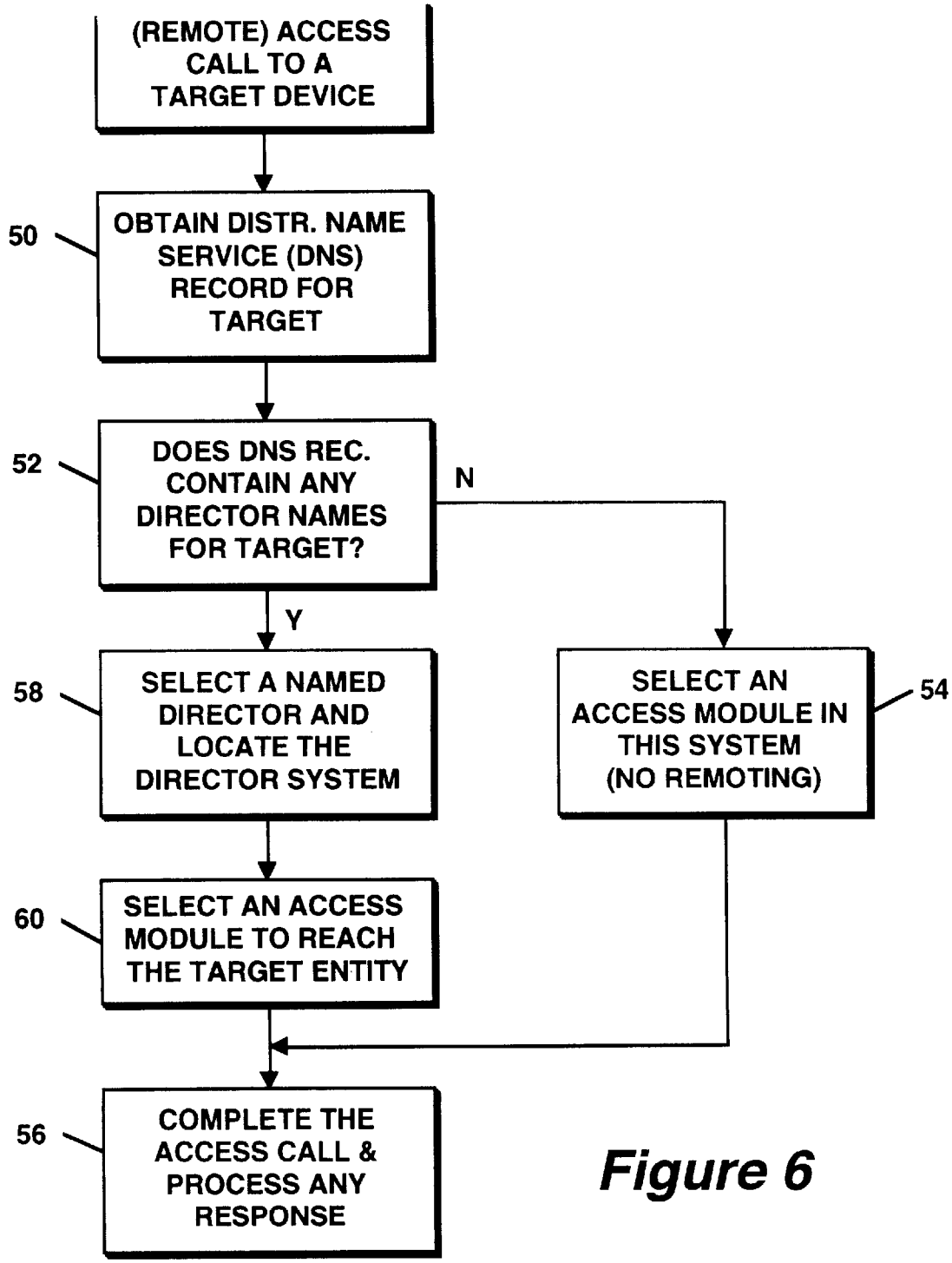
FIG. 6 is a flowchart showing the principal functions performed in processing a remote access call to a target device.

The basic steps followed by a function module in calling an access module, which may be remotely located, are shown in FIG. 6. The first step, as indicated in block 50, is to obtain information on the target entity or device, using the distributed name service (DNS). Included in this information are the names of any directors from which the target entity can be accessed. If no director names are found, as determined in block 52, the target entity is accessible from anywhere, and remote access is not used. An access module is selected within the director from which a procedure call is to be initiated, as indicated in block 54, and the call is completed in a normal manner, as indicated in block 56. This may include handling a response from the selected access module.

If the target entity must be accessed from another director, other than the one from which the procedure call is being initiated, the next step is to select a director name from the list obtained (in steps 50 and 52), and to determine the system on which the selected director is located, as indicated in block 58. Then an access module capable of performing the desired function on the target entity is selected, as indicated in block 60. Basically, the call is passed or forwarded to the selected access module, such as access module 26(3) in FIG. 5, by way of a chain of distributed director components, such as information manager 40B(2), dispatcher 40B(2), information manager 40B(3), and dispatcher 42B(3). Any response data associated with the call is passed back through the same distributed director chain.

The step of selecting a director, indicated in block 58, from a list of directors obtained through the distributed name service (DNS) may include selecting a second director if the first one selected is currently busy or unavailable for some other reason. If communication cannot be established with a selected director, another choice is made from the directors named as being capable of accessing the desired entity. If the entity cannot be reached through any of the listed directors, an error indication is provided to the calling module.

The remote function call is made to invoke a "value-added" function, beyond the capabilities of an access module, and usually performed by a function module. A significant feature of the remote call function is that it may be made in the context of a "domain" of managed entities, rather than in the context of a single target entity, as in the case of a remote access call. A domain is a user-defined logical collection of managed entities. A user managing a complex system may, for example, be interested in historical performance data relating to all of the network terminals in a particular building, and for this purpose the user would define these terminals as belonging to a single domain. In other instances, it may be convenient to define separate domains for the entities associated with various departments within a corporate structure, or to define different domains for different equipment types. For some purposes, it may be desirable to define a domain as including other domains.

Figure 7:
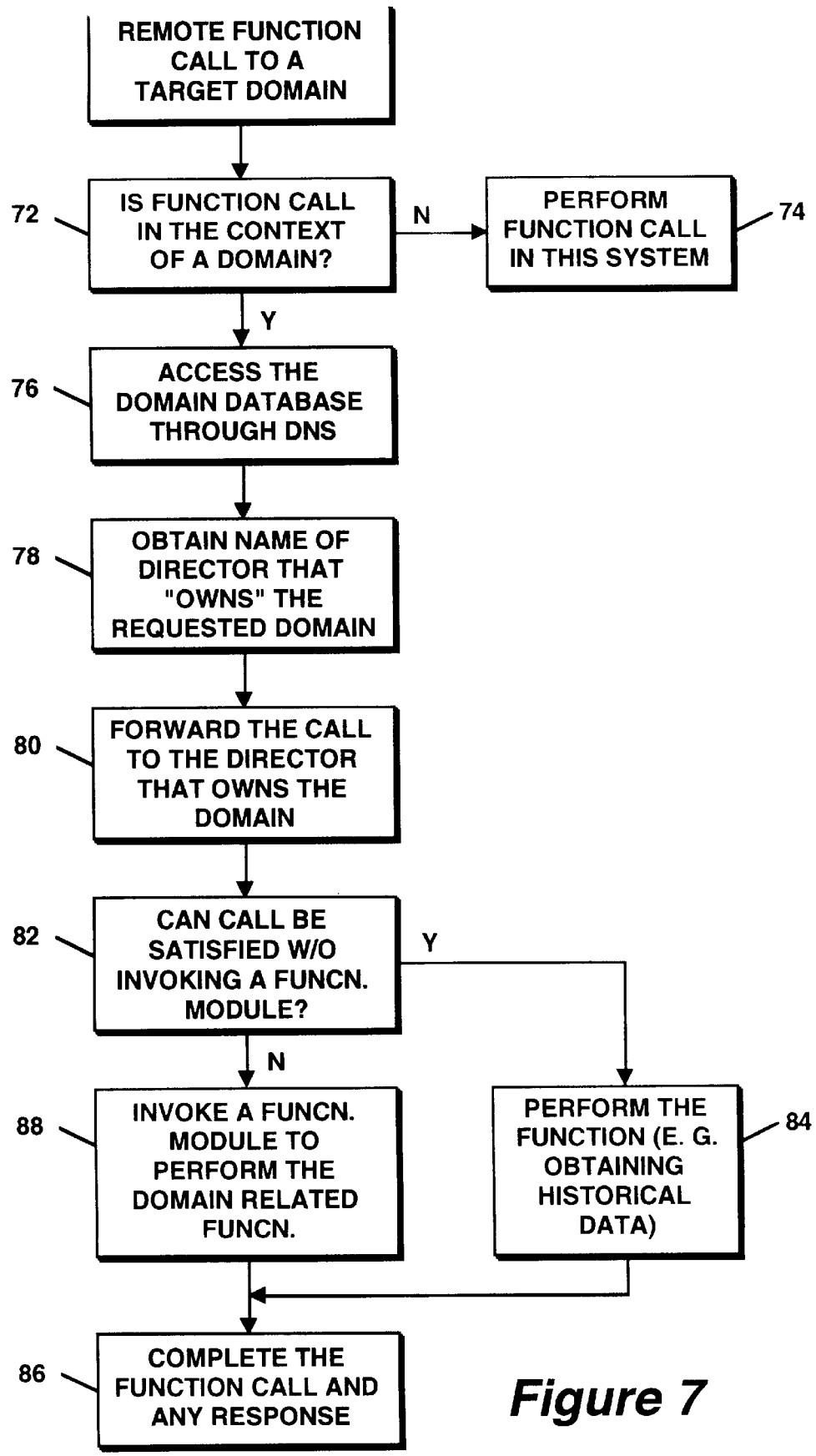
FIG. 7 is a flowchart showing the principal functions performed in processing a remote function call in the context of a domain.

A domain database is maintained to keep track of the membership in each domain, as well as the name of the director responsible for each domain, and other information relating to each domain. In processing a function call, i.e. a call to a function module, a director first determines whether the call is made in the context of a domain, as indicated in block 72 of FIG. 7. If the call parameters do not identify it as one made in the context of a domain, the call is handled as a function call within the calling system, as indicated in block 74, and as described in the cross-referenced patent application. If the call is made in the context of a domain, the domain database is accessed (block 76), and the name of the director responsible for the domain named in the call is obtained (block 78). Then the call is forwarded to the director responsible for the domain (block 80). Once the call is being processed by the director responsible for the domain with which the call is concerned, the next step is to determine, as indicated in block 82, whether the call can be satisfied without invoking a function module. The remote function call may, for example be a request for historical data pertaining to members of the domain. Compilations of historical data are typically stored in the data storage modules 44 associated with the management directors. If the call or request can be satisfied by retrieving data from the storage module 44 associated with the director responsible for the domain, then this action is taken, as indicated in block 84. Then the call is completed in a normal manner, as indicated in block 86. If the call cannot be satisfied without invoking a function call, then an appropriate function module is invoked, as indicated in block 88, and the call is completed. Satisfying the call may require invoking one or more access modules to obtain requested raw data.

An advantage of the domain-based function call is that it permits grouping of data by domain for presentation to a user. Domain-based function calls may also be made to request that historical data be stored automatically for each member of the domain, or that background processing be performed for each member of the domain. An example of background processing is a continual check on device status and alarm reporting in the event of unusual conditions.

It will be appreciated from the foregoing that the present invention represents a significant advance in the field of management of complex systems. In particular, the invention provides a technique for handling management functions in cases where components of the management system may be distributed among different physical systems. The invention also provides for the convenient collection and presentation of data in the context of user-defined domains of managed entities. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A management system, for monitoring or controlling a plurality of managed entities, the system comprising:

a user device;

at least one domain representing a group of managed entities;

a management director kernel for controlling a user request from the user device, the management director kernel being distributed amongst a plurality of interconnected systems, the management director kernel including:

a plurality of director kernel subsystems each residing in a different system;

a presentation module located on one of said systems for transferring information between the user device and the director kernel subsystem associated with the computer system containing said presentation module in response to the user request;

at least one function module located on another of said systems for transferring information between the director kernel subsystem associated with said computer system containing said function module and one of the domains; and remote function call processing means for processing a procedure call resulting from the user request, said remote call processing means comprising:

means for determining by said director kernel subsystem residing on said system containing said presentation module which of said other director kernel subsystems resides on said system containing said function module associated with said domain; and means for forwarding the procedure call to the determined management director kernel subsystem.

2. A management system as defined in claim 1, wherein the remote function call processing means further includes a domain database associated with the single management director kernel, and wherein said means for determining accesses the domain database to determine which of said other director kernel subsystems resides on said computer system containing said function module associated with said domain.

3. The management system of claim 2, the remote function call processing means further comprising:

means operative in the determined management director kernel subsystem for determining whether the call can be satisfied without invoking a call to the function module; and means operative in the determined management director kernel subsystem for invoking the function module if the call cannot be satisfied without doing so, wherein the invoked function module performs a desired function in relation to the domain named in the call.

4. A management system as defined in claim 3, wherein:

the procedure call requests historical data pertaining to operation of the domain entities; and the remote function call processing means will obtain the historical data, if possible, directly from a database in which historical data is recorded, or will obtain the requested data by invoking an appropriate function module.

5. A management system as defined in claim 3, wherein:

the procedure call pertains to a background function being performed in relation to a least some of the entities belonging to the domain.

6. A management system, for monitoring or controlling a plurality of managed entities, the system comprising:

a user device;

a plurality of managed entities;

a management director kernel for controlling a user request from the user device, the management director kernel being distributed amongst a plurality of interconnected systems, the management director kernel including:

a plurality of director kernel subsystems each residing in a different one of said systems;

a presentation module located on one of said systems for transferring information between the user device and the director kernel subsystem residing on the system containing said presentation module in response to the user request for access to one of said managed entities;

access modules located on said systems for transferring information between entities and the management director kernels associated with the systems on which the access modules reside, each entity being accessible by at least one access module;

remote access call processing means for processing a procedure call resulting from the user request, said remote access call processing means comprising:

means for determining by said management director kernel subsystem residing on the system containing said presentation module which of said other director kernel subsystems resides on a system having an access module capable of accessing said entity; and means for forwarding the procedure call to the determined management director kernel subsystem.

7. A management system as defined in claim 6, wherein the management director kernel further comprises a database having entries, each entry identifying a managed entity and a list of director kernel subsystems which reside on systems having access modules capable of accessing the managed entity, and wherein the means for determining accesses said database to determine which of said other director kernel subsystems resides on a system having an access module capable of accessing said entity.

8. A management system as defined in claim 7, wherein if the means for determining determines that the managed entity can be controlled or monitored from anywhere, the remote access call processing means selects the director kernel subsystem on which the presentation module resides for control or monitoring of the managed entity.

* * * * *